ён
United States Patent
Swiniarski (10) Patent No.: US 9,845,066 B2
(45) Date of Patent: Dec. 19, 2017

(54) SIDE CURTAIN AIRBAG ASSEMBLY FOR A MOTOR VEHICLE

(71) Applicant: FORD GLOBAL TECHNOLOGIES, LLC, Dearborn, MI (US)

(72) Inventor: Michal Jan Swiniarski, Brentwood (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/141,898

(22) Filed: Apr. 29, 2016

(65) Prior Publication Data

US 2016/0318471 A1    Nov. 3, 2016

(30) Foreign Application Priority Data

Apr. 30, 2015  (GB) .................................. 1507449.5

(51) Int. Cl.
*B60R 21/213*    (2011.01)
*B60R 21/232*    (2011.01)
(Continued)

(52) U.S. Cl.
CPC .......... *B60R 21/232* (2013.01); *B60R 21/213* (2013.01); *B60R 21/233* (2013.01); *B60R 2021/161* (2013.01)

(58) Field of Classification Search
CPC ... B60R 21/213; B60R 21/232; B60R 21/233; B60R 2021/161; B60R 2021/23107; B60R 21/36
See application file for complete search history.

(56) References Cited

U.S. PATENT DOCUMENTS 7,172,048 B2 *    2/2007    Hamada ............... B60R 21/2338
                                                                  180/271
7,584,988 B2 *    9/2009    Okamoto ................ B60R 21/36
                                                                  180/274
(Continued)

FOREIGN PATENT DOCUMENTS

JP    2007076542 A  *  3/2007    ............. B60R 21/36
JP    2012232674 A     11/2012
JP    2012245897 A     12/2012

OTHER PUBLICATIONS

Intellectual Property Office, Combined Search and Examination Report under Sections 17 and 18(3) for corresponding Great Britain Patent Application No. GB1507449.5 dated Oct. 9, 2015.

*Primary Examiner* — Laura Freedman
(74) *Attorney, Agent, or Firm* — Frank A. MacKenzie; Brooks Kushman P.C.

(57) ABSTRACT

A side curtain airbag assembly for a motor vehicle has an airbag that includes a pair of deployable outwardly extending tongues. The tongues project are positioned so as to engage an upstanding structural member such as a "B" pillar when they are inflated/deployed so that the "B" pillar is sandwiched between the two tongues. The tongues act to resist longitudinal movement of the airbag thereby reducing outward bulging of the airbag if it is subject to an impact force from an interior of the motor vehicle. The tongues are inflated via respective tubes that receive inflation gasses from the airbag and conduct the gasses into the tongues. The inlet ends of the tubes are adjacent a lower end thereof to ensure that the tongues are not inflated until the airbag is fully deployed downward. The tubes may extend within the interior of the airbag or along the exterior.

17 Claims, 6 Drawing Sheets

(51) Int. Cl.
*B60R 21/233* (2006.01)
*B60R 21/16* (2006.01)

(56) References Cited

U.S. PATENT DOCUMENTS

| | | | |
|---|---|---|---|
| 7,618,057 B2* | 11/2009 | Pinsenschaum | B60R 21/232 |
| | | | 280/729 |
| 8,474,865 B2 | 7/2013 | Grindle | |
| 8,523,222 B2 | 9/2013 | Scott et al. | |
| 8,613,466 B2* | 12/2013 | Wiik | B60R 21/213 |
| | | | 280/729 |
| 9,211,863 B2* | 12/2015 | Kashio | B60R 21/232 |
| 2007/0023223 A1* | 2/2007 | Okamoto | B32B 17/10036 |
| | | | 180/274 |
| 2016/0039384 A1* | 2/2016 | Fukawatase | B60R 21/23138 |
| | | | 280/729 |

* cited by examiner

SIDE CURTAIN AIRBAG ASSEMBLY FOR A MOTOR VEHICLE

CROSS-REFERENCE TO RELATED APPLICATIONS

This application claims foreign priority benefits under 35 U.S.C. §119(a)-(d) to GB 1507449.5 filed Apr. 30, 2015, which is hereby incorporated by reference in its entirety.

TECHNICAL FIELD

This invention relates to motor vehicle safety and, in particular, to a side curtain airbag assembly for a motor vehicle.

BACKGROUND

It is well known to provide a motor vehicle with a side curtain airbag to protect an occupant of the motor vehicle from contact with a side of the motor vehicle during an accident and to prevent a body part of the occupant from passing through a window aperture during a roll-over event.

It is further known from, for example, U.S. Pat. No. 8,523,222 to provide such a curtain airbag with fingers that are arranged to overlie a roof-supporting pillar of the motor vehicle such as a "B, "C" or "D" pillar in order to resist expulsion of the airbag through a side window of the motor vehicle during a rollover event.

Although the aforementioned US Patent improves the rollover performance of a side curtain, the inventor has realized that a further improvement could be made if bulging of the airbag due to the effect of an impact of a body part with an inner surface of the airbag could be reduced.

SUMMARY

It is an object of the invention to provide a side curtain airbag assembly for a motor vehicle that has improved resistance to outward bulging of the airbag.

According to a first aspect of the invention there is provided a side curtain airbag assembly for a motor vehicle comprising an elongate airbag having an inflatable body defining at least one inflatable chamber and at least one inflator for inflating the at least one inflatable chamber so that when the airbag is deployed the airbag overlies an upwardly extending, roof-supporting structural member (also known as a pillar) of the motor vehicle wherein the airbag further comprises at least one pair of secondary chambers inflated by the at least one inflator after inflation of the at least one inflatable chamber, each pair of secondary chambers comprising a first tongue extending away from the body of the airbag so as to be positioned when deployed adjacent to a front face of the pillar and a second tongue extending away from the body of the airbag so as to be positioned when deployed adjacent a rear face of the pillar, the first and second tongues acting when deployed to resist longitudinal displacement of the airbag relative to the pillar.

When deployed, the first and second tongues may be positioned so as to clamp the pillar therebetween.

Each of the first and second tongues may be supplied with gas from the at least one inflator via a respective gas supply tube having an inlet end connected to the at least one inflatable chamber near a lower end of the at least one inflatable chamber to ensure that the first and second tongues are inflated after inflation of the at least one inflatable chamber.

Prior to deployment, the first and second tongues may be stowed within the at least one inflatable chamber.

Prior to deployment, the first and second tongues along with their respective gas supply tubes may be stowed within the at least one inflatable chamber.

When deployed, the first and second tongues may extend from respective positions towards an upper edge of the airbag.

The inflatable body of the airbag may define first and second inflatable chambers and the first tongue may be connected to the first inflatable chamber and the second tongue may be connected to the second inflatable chamber.

The first tongue may be supplied with gas via a first gas supply tube having an inlet end connected to the first inflatable chamber near a lower end of the first inflatable chamber to ensure that the first tongue is inflated after inflation of the first inflatable chamber.

Prior to deployment, the first tongue may be stowed within the first inflatable chamber.

Prior to deployment, the first tongue along with the first gas supply tube may be stowed within the first inflatable chamber.

The second tongue may be supplied with gas via a second gas supply tube having an inlet end connected to the second inflatable chamber near a lower end of the second inflatable chamber to ensure that the second tongue is inflated after inflation of the second inflatable chamber.

Prior to deployment, the second tongue may be stowed within the second inflatable chamber.

Prior to deployment, the second tongue along with the second gas supply tube may be stowed within the second inflatable chamber.

According to a second aspect disclosed herein, a motor vehicle having a passenger compartment including a pillar, a roof, a floor and two side walls and at least one side curtain airbag assembly described above fitted in the passenger compartment. Prior to deployment, the airbag is positioned close to a roof of the passenger compartment and, when deployed, the airbag extends downward along one of the side walls so as to overlie an upper part of the side wall and the pillar.

There may be two side curtain airbag assemblies mounted in the passenger compartment, there being a first side curtain airbag assembly mounted on a right hand side of the passenger compartment and a second side curtain airbag assembly mounted on a left hand side of the passenger compartment.

The invention will now be described by way of example with reference to the accompanying drawing of which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
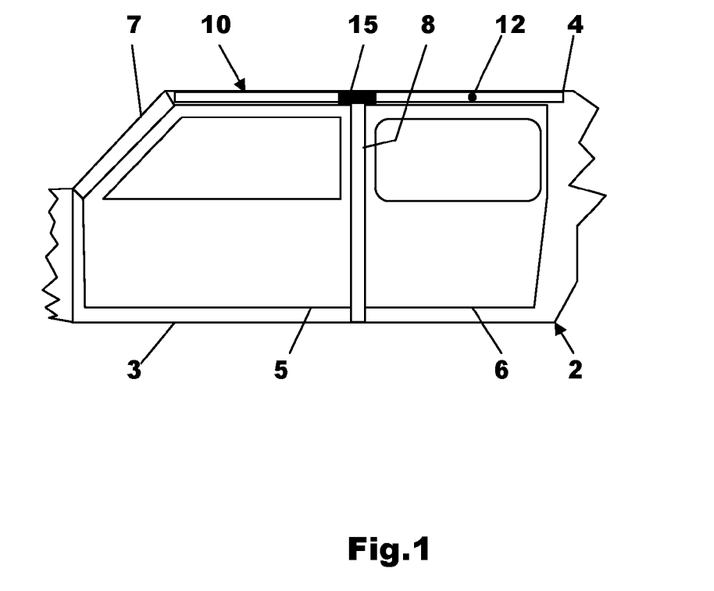
FIG. 1 is a diagrammatic side view of part of a motor vehicle showing an inner side of a side wall of a passenger compartment and a side curtain airbag assembly according to the invention with an airbag of the side curtain airbag assembly in a stowed position.
Figure 2:
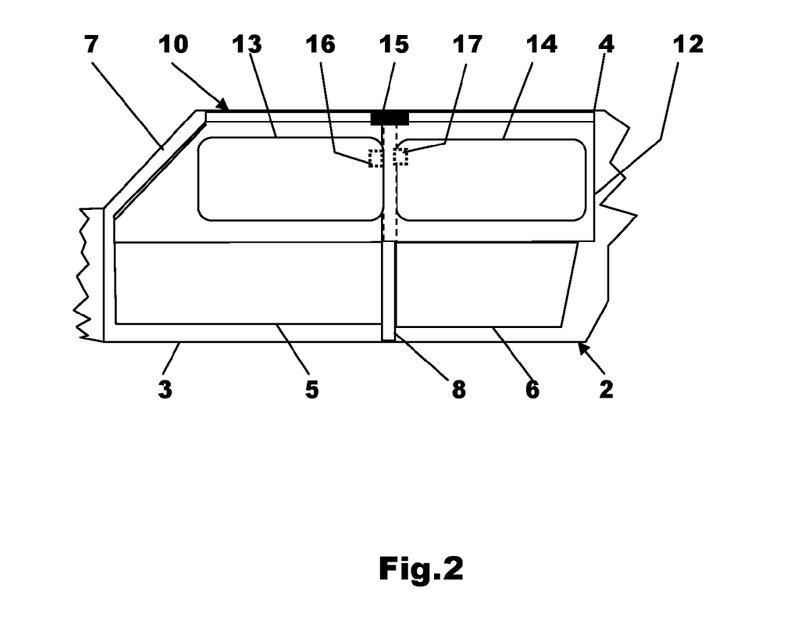
FIG. 2 is a diagrammatic view similar to FIG. 1 but showing the airbag in a deployed position.
Figure 3:
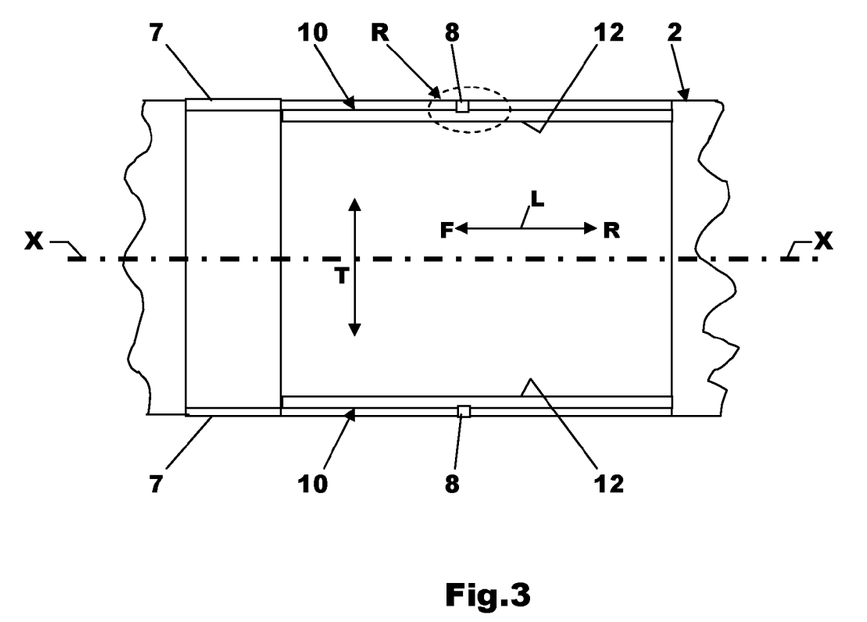
FIG. 3 is a plan view of the part of the motor vehicle shown in FIG. 1.

With particular reference to FIGS. 1 to 3 there is shown a motor vehicle 2 defining a passenger compartment having a floor 3, a roof 4, two side walls, front and rear doors 5 and 6, a front roof support in the form of an "A" pillar 7 and an intermediate roof support in the form of a roof-supporting structural member or "B" pillar 8. It will be appreciated that in some motor vehicle there may be more than one roof-supporting member, there could, for example, be, in addition to the "B" pillar, a "C" pillar and a "D" pillar. Furthermore in the case of a passenger vehicle such as a minibus or coach there may be a number of roof-supporting members/pillars spaced out along the passenger compartment.

A side curtain airbag assembly 10 is fitted in the passenger compartment to protect occupants particularly in the event of a rollover event. The side curtain airbag assembly 10 comprises in this case an airbag 12 and a single airbag inflator 15. It will be appreciated that the airbag inflator need not be positioned as shown in FIG. 1, it could, for example, be located within the "A" pillar 7. It will further be appreciated that there could be more than one inflator for the airbag 12.

The airbag 12 extends in a substantially longitudinal direction of the motor vehicle 2 and, when stowed, is rolled up so as to lie close to the roof 4 of the passenger compartment and is normally concealed behind a cover or trim member (not shown). When the airbag 12 is deployed, as shown in FIG. 2, it extends downward along one of the side walls of the passenger compartment so as to overlie an upper part of the respective side wall.

The airbag 12 has an upper edge or attachment edge located near to the roof 4 and which is secured to the motor vehicle 2, and an inflatable body made from a flexible material and defines, in the illustrated embodiment, two primary inflatable chambers 13, 14. The first chamber 13 is positioned so as to overlie a window aperture in the front door 5 and the second inflatable chamber 14 is positioned so as to overlie a window aperture in the rear door 6. The front and rear doors 5, 6, along with the separating B-pillar 8, form the passenger compartment side wall in the sedan-type vehicle illustrated.

The material from which the airbag 12 is made is relatively impermeable to gas so as to permit the first and second chambers 13 and 14 to be inflated by the airbag inflator 15. The first and second inflatable chambers 13 and 14 are arranged to receive gas at respective upper edges from the airbag inflator 15 via inlets formed in the body of the airbag 12.

The airbag 12 also includes a pair of secondary chambers in the form of first and second tongues 16 and 17. The first tongue 16 receives a supply of gas from the airbag inflator 15 via the first chamber 13 and the second tongue 17 receives a supply of gas from the airbag inflator 15 via the second chamber 14. In both cases the connection of the respective tongue 16, 17 to the respective primary chamber 13, 14 is constructed such that the primary chamber 13, 14 is virtually fully inflated before gas can flow into the relevant tongue 16, 17. This delayed inflation of the tongues 16, 17 is achieved by connecting the first and second tongues 16 and 17 to the primary chamber 13, 14 via inlets (not shown in any of FIGS. 1 to 3) located near to a lower or free edge of the respective primary chamber 13, 14. Therefore, during deployment, the airbag 12 has to unfold/unroll to its deployed position before filling of the two tongues 16, 17 begins. The delayed deployment of the two tongues 16, 17 ensures that the two tongues 16, 17 do not interfere with the correct deployment of the airbag 12.

With particular reference to FIG. 3 the motor vehicle 2 has a longitudinal axis X-X extending in a longitudinal direction of the motor vehicle 2 indicated by the double headed arrow "L" on FIG. 3. The direction of the front of the motor vehicle 2 is indicated by the letter "F" at one end of the double arrow "L" and the rear of the motor vehicle 2 is indicated by the letter "R" the opposite end of the double arrow "L". A transverse direction of the motor vehicle 2 is indicated by the double headed arrow "T".

When the two tongues 16, 17 are deployed they extend outwardly from the airbag 12 so as to engage with respective upwardly extending structural supports which in this case are "B" pillars 8 on the left and right hand sides of the motor vehicle 2. The two tongues 16, 17 extend outboard with reference to the motor vehicle 2, away from the longitudinal axis X-X of the motor vehicle 2 and in a substantially transverse direction of the motor vehicle 2.

The function of the two tongues 16, 17 will now be described with reference to FIG. 4 that shows on an enlarged scale a plan view of the right hand side roof-supporting structural member or "B" pillar 8 and the airbag 12 in a fully deployed state. It will be appreciated that, as shown in FIG. 4, the pillar 8 normally comprises at least one trim member 8*t* covering the structural (load-carrying) portion of the pillar, and that the two tongues 16, 17 in such a case will engage or abut against the trim member 8*t* rather than the structural portion itself.

The first tongue 16 extends away from a body of the airbag 12 so as to be positioned in this fully deployed state adjacent to a front face of the pillar 8 and the second tongue 17 extends away from the body of the airbag 12 so as to be positioned in this fully deployed state adjacent a rear face of the pillar 8.

The positioning of the first and second tongues 16 and 17 in front of and to the rear of the pillar 8 resist longitudinal displacement of the airbag 12 relative to the pillar 8.

Figure 4:
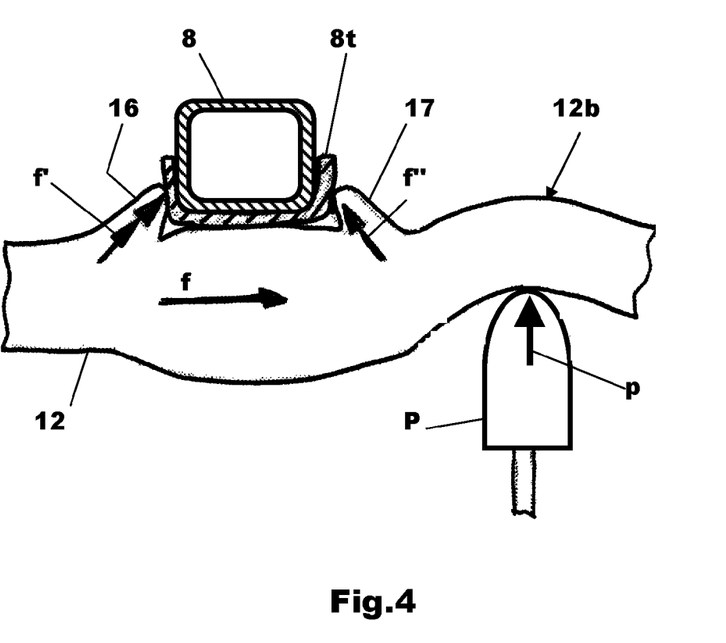
FIG. 4 is an enlarged view of the region "R" shown on FIG. 3, showing the interaction between the airbag and an pillar of the motor vehicle when the airbag is deployed and an object impacts an inner face of the airbag at a position offset from the pillar.

As shown in FIG. 4 the first and second tongues 16 and 17 are positioned so as to clamp the pillar 8 therebetween but it will be appreciated that they could alternatively be positioned such that a very small gap exists between each tongue 16, 17 and the adjacent face of the pillar 8.

In FIG. 4 an object P is shown impacting against an inner face of the airbag 12 in a position offset rearward from the pillar 8. This impact produces a force p directed outwardly with respect to the longitudinal axis of the motor vehicle 2 so as to cause the airbag 12 to bulge outwardly as indicated by the reference 12b on FIG. 4. The force p produces a longitudinal force f in the airbag 12, however, due to the engagement of the first tongue 16 with the pillar 8, bulging of the airbag 12 is reduced because the first tongue 16 resists longitudinal movement or slip of the airbag 12 relative to the pillar 8. This is because the internal longitudinal force f is transferred by the first tongue 16 to the pillar 8 as indicated by the arrow f' and so does not have to be resisted by the airbag 12 itself.

If the impact of the object P were to be forward of the pillar 8 then the second tongue 17 would resist longitudinal motion of the airbag 12 by transferring a force f" to the pillar 8 as shown in FIG. 4.

The two tongues 16, 17 therefore act to reduce bulging of the airbag 12 thereby reducing the risk that a body part could move outwardly past the pillar 8 in the event of a rollover event.

It will be appreciated that in practice the motor vehicle 2 will commonly have two side curtain airbag assemblies 10 fitted in the passenger compartment, one side curtain airbag assembly mounted on a right hand side of the motor vehicle 2 and one side curtain airbag assembly mounted on a left hand side of the motor vehicle 2.

With reference to FIGS. 5 to 8 the airbag 12 is shown in greater detail.

Figure 5:
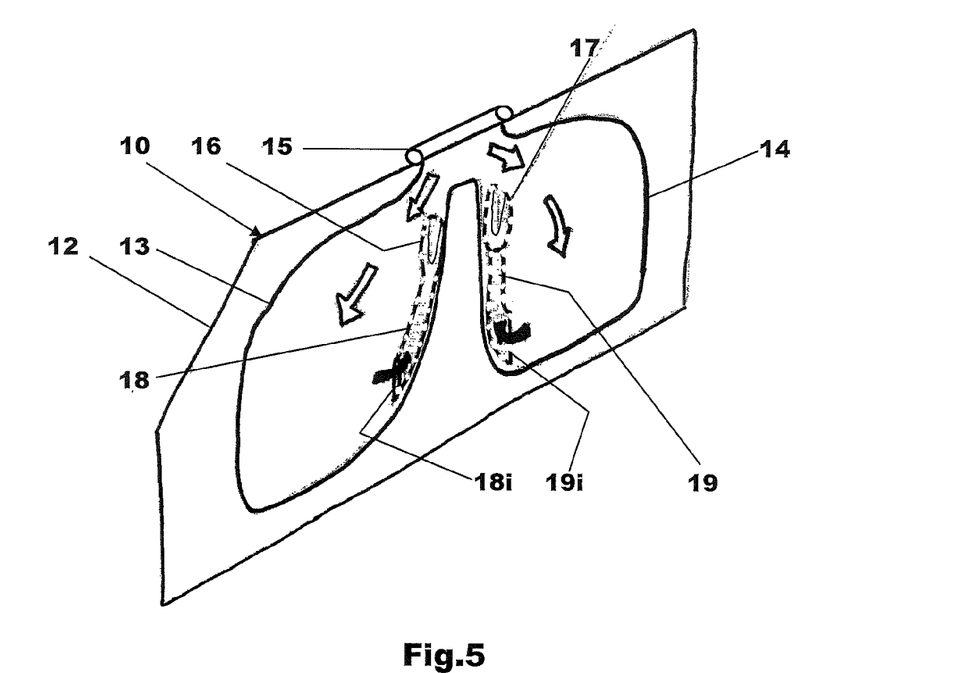
FIG. 5 is a pictorial view of a first embodiment of a side curtain airbag assembly during deployment.
Figure 6:
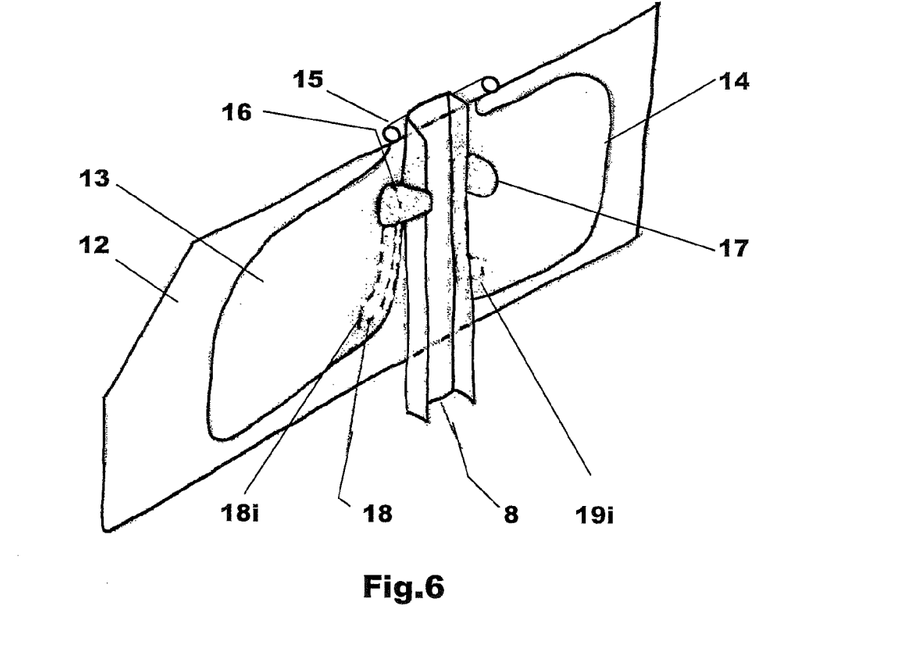
FIG. 6 is a view similar to FIG. 5 but showing the airbag in a fully deployed state.
Figure 7:
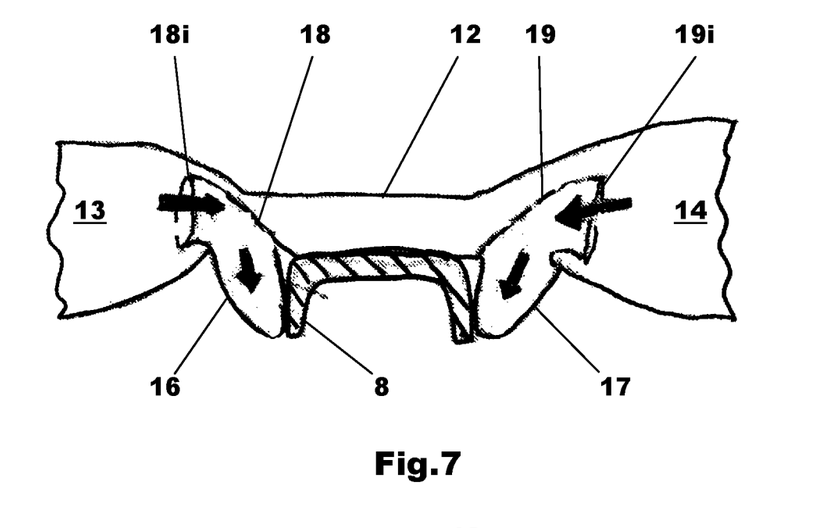
FIG. 7 is a plan view of part of the airbag shown in FIG. 6 showing the interaction between the airbag and a pillar.

The first tongue 16 has a gas supply tube 18 used to connect it to supply of gas from the first chamber 13 when the airbag 12 is deployed. The gas supply tube 18 has an inlet 18i located near a lower end (when the airbag is in its inflated condition wherein it lies in a generally vertical plane) of the first chamber 13 so that the first chamber 13 has to be virtually fully inflated before gas can flow freely to the first tongue 16 from the airbag inflator 15. This ensures that the airbag 12 is allowed to unroll into is deployed position before the first tongue 16 is inflated and also ensures that the first tongue 16 does not interfere with normal deployment of the airbag 12.

The second tongue 17 has a gas supply tube 19 used to connect it to supply of gas from the second chamber 14 when the airbag 12 is deployed. The gas supply tube 19 has an inlet 19i located near a lower end of the second chamber 14 so that the second chamber 14 has to be virtually fully inflated before gas can flow freely to the second tongue 17 from the airbag inflator 15. As before, this ensures that the airbag 12 is allowed to unroll into is deployed position before the second tongue 17 is inflated and also ensures that the second tongue 17 does not interfere with normal deployment of the airbag 12.

The first and second tongues 16 and 17 are positioned on the airbag 12 such that, when they are deployed, they extend from respective positions towards an upper end of the airbag 12.

When the airbag 12 is in its stowed position, the first and second tongues 16 and 17 along with their respective gas supply tubes 18, 19 are located within the first and second primary chambers 13 and 14 respectively and the airbag 12 is folded or rolled up so as to lie close to the roof 4 of the motor vehicle 2.

In FIG. 5 the airbag 12 is shown partially deployed and the airbag 12 has unrolled. In this state of deployment the first and second chambers 13 and 14 are virtually fully inflated, gas is beginning to flow into the gas supply tubes 18, 19 via the respective inlets 18i, 19i but the first and second tongues 16 and 17 have yet to deploy. That is, the tongues 16, 17 are still in their stowed positions wherein they are tucked back inside the respective outlet ends of the gas supply tubes 18, 19

In FIG. 6 the airbag 12 is shown fully deployed, the first and second tongues 16 and 17 have fully deployed and are located to either side (fore and aft) of the upstanding structural support 8 so as to resist longitudinal movement of the airbag 12 relative to the upstanding structural support 8.

Figure 8:
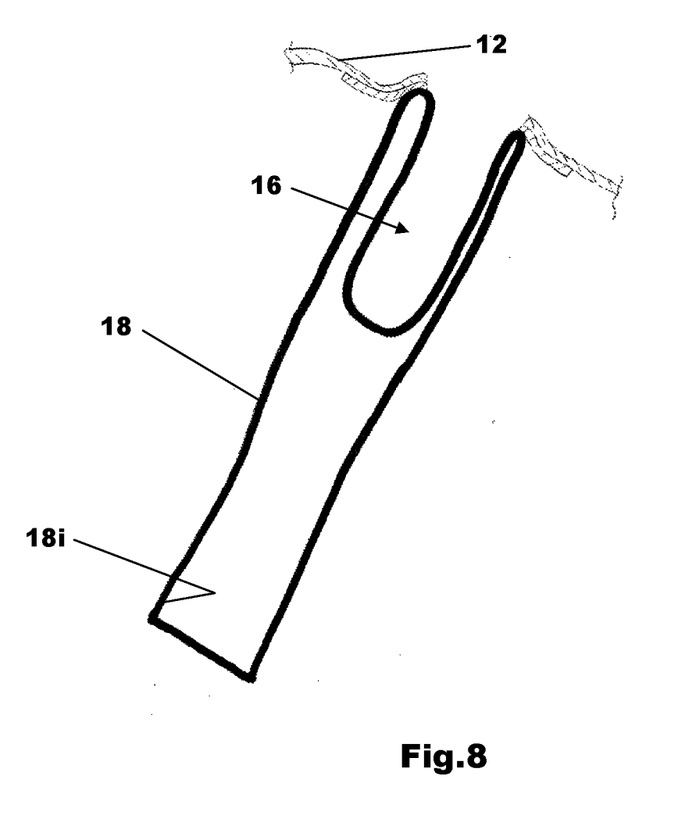
FIG. 8 is a sketch showing how the material used to form a secondary chamber is formed as part of and is folded back inside a gas supply tube.

In FIG. 8 there is shown, in sketch form, how the first tongue 16 is folded back into the outlet end of gas supply tube 18 prior to inflation. The gas supply tube 18 and the first tongue 16 are formed as a single component that is similar to a balloon and are attached to the material forming the body of the airbag 12. It will be appreciated that alternative constructions could be used to form the first tongue 16 and gas supply tube 18. The second tongue 17 and its respective gas supply tube 19 are also in this case formed as a balloon and folded in the same manner as the first tongue 16 and gas supply tube 18 shown in FIG. 8.

Figure 9:
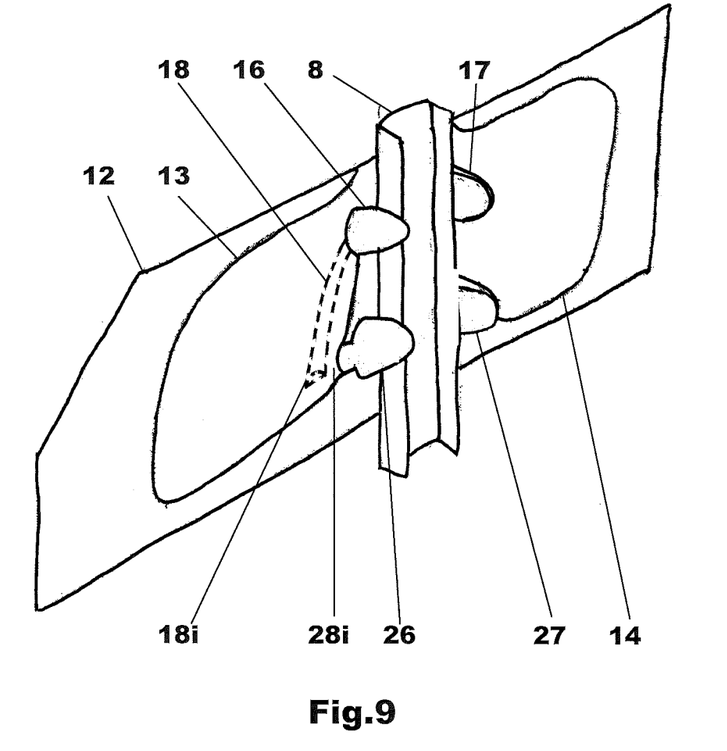
FIG. 9 is a view similar to FIG. 6 but showing a second embodiment of an airbag for a side curtain airbag assembly having two pairs of secondary chambers in deployed states.

FIG. 9 shows a side curtain airbag assembly that is in most respects the same as that shown in FIG. 6. The only difference is that, in addition to the first and second tongues 16 and 17, two further tongues 26, 28 are provided.

As before, each of the further tongues 26, 27 receives a flow of gas from the airbag inflator 15 via the primary chamber 13, 14 to which it is connected at a position close to the lower end of the respective primary chamber 13, 14. However because in this case the additional tongues 26, 27 are positioned close to the lower end of the respective primary chamber 13, 14 they are connected directly to the primary chambers without the need for a gas supply tube, the further tongue 26 has an inlet 28i connecting it to the first chamber 13 and the further tongue 27 has an inlet (not shown) connecting it to the second chamber 14. The further tongues 26, 28 are, prior to deployment, stowed within the respective chamber 13, 14 from which they receive a supply of gas.

It will be appreciated that a further embodiment could be provided by removing the first and second tongues 16, 17 and keeping the additional tongues 26, 27.

Figure 10:
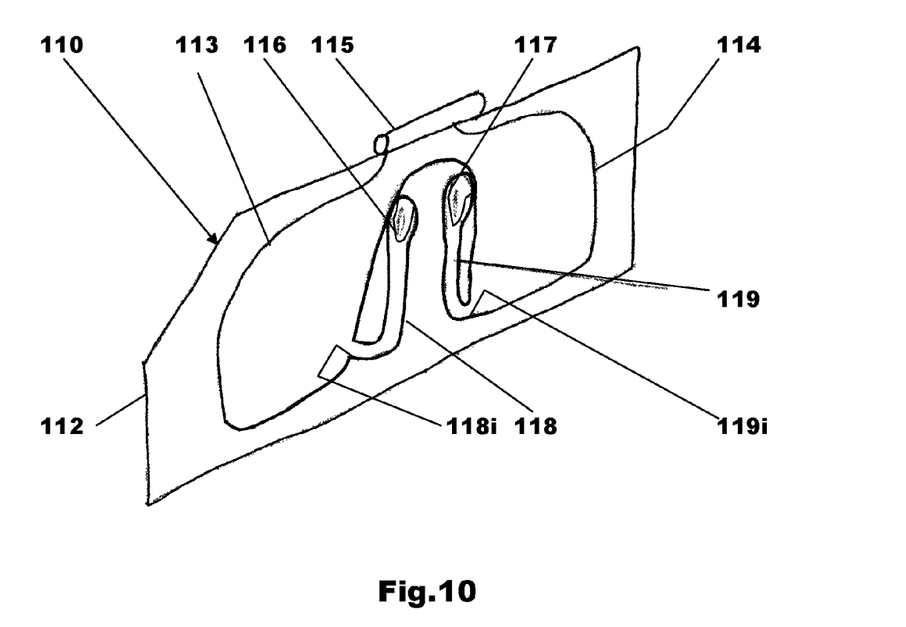
FIG. 10 is a pictorial view similar to FIG. 5 but showing a third embodiment of a side curtain airbag assembly during deployment.
Figure 11:
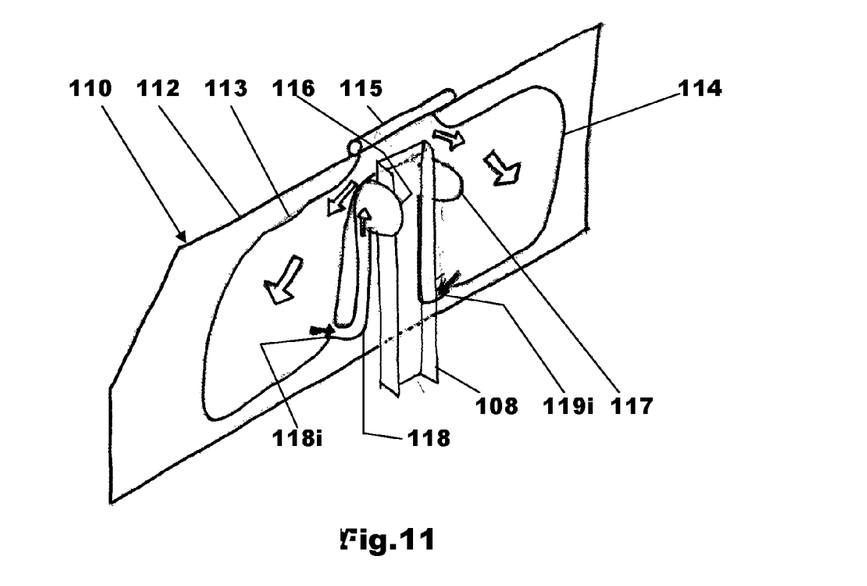
FIG. 11 is a view similar to FIG. 10 but showing the airbag in a fully deployed state.

With reference to FIGS. 10 and 11 there is shown a further embodiment which in most respects is the same as that shown in FIGS. 5 and 6 and for which the same reference numerals are used with the addition of 100.

The side curtain airbag assembly 110 comprises as before, an airbag 112 defining first and second chambers 113 and 114 arranged to be filled with gas from an airbag inflator 115 and first and second tongues 116 and 117 connected to the first and second chambers 116 and 117 respectively by respective gas supply tubes 118, 119. Each of the gas supply tubes 118, 119 having a respective inlet 118i, 119i connected near a lower end of the respective chamber 113, 114 to which it is connected.

The main difference between this embodiment and that previously described with reference to FIGS. 5 and 6 is that, in the case of this embodiment, the first and second tongues 116 and 117 and their respective gas supply tubes 118, 119 are, prior to being inflated, arranged outside of but connected to the first and second chambers 113, 114.

As before, when the airbag 112 is deployed the first and second tongues 116 and 117 do not begin to be inflated until after the first and second chambers 113 and 114 have received sufficient gas from the airbag inflator 115 to cause the chambers to unfold/unroll completely downward, thereby ensuring that the first and second tongues do not interfere with normal downward deployment of the airbag 112.

When the two tongues 116, 117 are deployed they extend outwardly from the airbag 112 so as to sandwich therebetween an upwardly extending structural support, such as pillar 108. The two tongues 116, 117 extend outboard with reference to the motor vehicle 2, away from the longitudinal axis X-X of the motor vehicle 2 and in a substantially transverse direction of the motor vehicle 2.

The first tongue 116 extends away from a body of the airbag 112 so as to be positioned in the fully deployed state adjacent to a front face of the upwardly extending pillar 108 and the second tongue 117 extends away from the body of the airbag 112 so as to be positioned in the fully deployed state adjacent a rear face of the pillar 108. The first and second tongues 116 and 117 are positioned either to clamp the pillar 108 therebetween or such that a very small gap exists between each tongue 116, 117 and the adjacent face of the pillar 108.

As before, the positioning of the first and second tongues 116 and 117 resists longitudinal displacement of the airbag 112 relative to the pillar 108.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

For example, although the invention has been shown and described with reference to an airbag having two chambers it will be appreciated that the invention could also be applied to an airbag having a single chamber. With such a single chamber arrangement both of the tongues are connected to receive gas from the same chamber. As before, the single chamber of the airbag is deployed before the two tongues are deployed. A similar gas supply tube arrangement could be provided as that shown in FIGS. 5 and 6.

It will be further appreciated that the motor vehicle could have a number of roof-supporting pillars along each side of the passenger compartment and there could be a number of pairs of tongues positioned relative to the pillars for engagement therewith so as to resist longitudinal movement of the airbag relative to each of the pillars.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An airbag assembly comprising:
   an inflator;
   a body comprising first and second inflatable chambers adapted for installation in a stowed position adjacent a roof of a motor vehicle and, when inflated by gas from the inflator, deploying downwardly to a position overlying a roof-supporting pillar of the vehicle;
   first and second inflatable tubes having inlet ends receiving gas from the respective first and second chambers adjacent respective lower edges thereof, the tubes extending upward toward the roof when inflated; and
   first and second tongues receiving gas from respective outlet ends of the first and second tubes and extending therefrom to contact, when inflated, respective front and rear faces of the pillar.

2. The airbag of claim 1 wherein the first tongue and the first tube are stowed within the first chamber prior to deployment.

3. The airbag of claim 2 wherein the second tongue and the second tube are stowed within the second chamber prior to deployment.

4. The airbag of claim 1 further comprising third and fourth inflatable tongues connected to the first and second chambers respectively adjacent the lower edges thereof and projecting therefrom when inflated to respective positions adjacent the front and rear faces of the pillar at vertical locations lower than the first and second tongues.

5. The airbag of claim 4 wherein the third and fourth tongues are stowed inside the first and second chambers respectively prior to inflation.

6. The airbag of claim 1 wherein the first chamber is positioned adjacent a first window forward of the pillar and the second chamber positioned adjacent a second window rearward of the pillar.

7. An airbag assembly comprising:
   an inflator;
   an inflatable body adapted for installation in a stowed position adjacent a roof of a motor vehicle and, when inflated by gas from the inflator, deploying downwardly to overlie a roof-supporting pillar of the vehicle, the body comprising a first chamber positioned adjacent a first window forward of the pillar and a second chamber positioned adjacent a second window rearward of the pillar;
   first and second inflatable tubes extending within the first and second chambers respectively, each tube having an inlet end receiving gas from its respective chamber at a first position adjacent a lower edge thereof and extending within its respective chamber to a second position farther from the lower edge than the first position; and
   first and second tongues extending from respective outlet ends of the first and second tubes to contact, when inflated, respective front and rear faces of the pillar.

8. The airbag of claim 7 wherein the first tongue is stowed within the first tube prior to deployment.

9. The airbag of claim 8 wherein the second tongue is stowed within the second tube prior to deployment.

10. The airbag of claim 7 further comprising third and fourth inflatable tongues connected to the first and second chambers respectively adjacent the lower edges thereof and projecting therefrom when inflated to respective positions adjacent the front and rear faces of the pillar at vertical locations lower than the first and second tongues.

11. The airbag of claim 10 wherein the third and fourth tongues are stowed inside the first and second chambers respectively prior to inflation.

12. An airbag comprising:
   a body inflatable to overlie a vehicle roof-supporting pillar;
   first and second tongues spaced from one another, connected to the body and extending therefrom, when inflated, to positions adjacent respective front and rear pillar faces to clamp the pillar therebetween; and first and second tubes having respective outlet ends supplying inflation gasses to the respective tongues, and extending within the body to position respective inlet ends adjacent a lower edge thereof.

13. The airbag of claim 12 wherein the first and second tongues are stowed inside the tubes prior to inflation.

14. The airbag of claim 12 further comprising third and fourth inflatable tongues connected to the body adjacent the lower edge thereof and extending therefrom when inflated to respective positions adjacent the front and rear faces of the pillar at vertical locations lower than the first and second tongues.

15. The airbag of claim 14 wherein the third and fourth tongues are stowed inside the body prior to inflation.

16. The airbag of claim 12 wherein the body comprises first and second inflatable chambers and the first tube is within the first chamber and the second tube is within the second chamber.

17. The airbag of claim 16 wherein, when inflated, the first chamber overlies a first window forward of the pillar and the second chamber overlies a second window rearward of the pillar.

* * * * *